United States Patent Office 2,980,657
Patented Apr. 18, 1961

2,980,657

QUATERNARY AMMONIUM COMPOUNDS OF POLYMERS OF ACRYLAMIDO TYPE AND METHODS FOR MAKING THEM

Sidney Melamed, Philadelphia, Pa., assignor to Rohm & Haas Company, Philadelphia, Pa., a corporation of Delaware No Drawing. Filed July 6, 1954, Ser. No. 441,643

23 Claims. (Cl. 260—86.1)

This invention relates to quaternary ammonium compounds of polymers or resins of acrylamide type and to the production thereof.

It is an object of the present invention to provide novel quaternary ammonium compounds. A more particular object is to provide quaternary ammonium compounds of polymers or resins of the acrylamide type having a variety of solubilities, some being of the water-insoluble, organic-solvent soluble type, and some being water-soluble. A further object is to provide quaternary ammonium compounds of this type which, because of their various solubilities, may be adapted for use in numerous ways as will be more particularly pointed out hereinbelow. Other objects and advantages of the invention will be apparent from the description thereof hereinafter.

The polyquaternary ammonium compounds of the present invention are the linear polymers exclusively of monoethylenically unsaturated monomeric units comprising from 1 to 100 mol percent, preferably at least 20 mol percent, of amide units of the formula

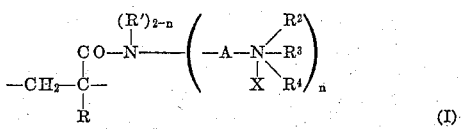

(I)

where R is hydrogen or a lower alkyl group having 1 to 3 carbon atoms, R' is hydrogen or a lower alkyl group having 1 to 4 carbon atoms, A is a straight or branched chain alkylene group having 2 to 10 carbon atoms or a divalent saturated aliphatic group consisting of a plurality of alkylene groups of 2 to 10 carbon atoms each pair of which is connected by an ether oxygen atom, $R^2$ and $R^3$ may be (1) separate groups selected individually from the group consisting of alkyl groups having 1 to 12 carbon atoms, hydroxyalkyl groups having 2 to 12 carbon atoms, alkoxyalkyl groups having 2 to 12 carbon atoms, (polyalkoxy)alkyl groups having 2 to 12 carbon atoms, and (2) a single saturated aliphatic group which together with the N atom forms a heterocyclic group containing 5 to 6 atoms in the ring of which 4 to 5 are carbon and which may contain a second atom of the group consisting of O, N, and S, the second atom, if nitrogen, being substituted by an alkyl group having 1 to 18 carbon atoms, $R^4$ is selected from saturated and unsaturated aliphatic hydrocarbon groups having 1 to 18 carbon atoms, (polyalkoxy)alkyl groups having 2 to 18 carbon atoms, alkoxyalkyl groups having 2 to 18 carbon atoms, hydroxyalkyl groups having 2 to 18 carbon atoms, an aralkyl or substituted aralkyl group having 7 to 24 carbon atoms, or a phenoxyalkyl group having 7 to 24 carbon atoms, X is OH or a negative, salt-forming atom or radical, and $n$ is an integer having a value from 1 to 2.

A preferred group of the compounds of this invention are those having units of the formula

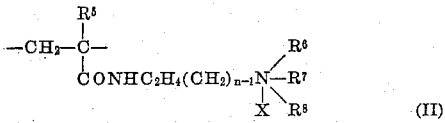

(II)

where $R^5$ is hydrogen or methyl, $n$ is an integer from 1 to 2, $R^6$ and $R^7$ are methyl or ethyl, and $R^8$ is a saturated or unsaturated aliphatic hydrocarbon group having 1 to 18 carbon atoms, and X has the same meaning as above. Another preferred group are those having the Formula II in which the symbols have the same meaning except that $R^6$ and $R^7$ form with the adjoining nitrogen atom a morpholino group. Another preferred group are those having the Formula II with the same meanings of the symbols as in the first preferred group except that $R^8$ is an aralkyl group of the class consisting of a benzyl group and alkyl-substituted benzyl groups in which the alkyl group has 1 to 18 carbon atoms. Of these several preferred groups, those compounds in which $R^5$ is hydrogen have the advantage in respect to ease of manufacture.

These new quaternary ammonium compounds are solid resinous products having at least five monomeric units containing quaternary ammonium groups therein. Generally, the polymers contain from 20 to 20,000 monomeric units of which at least five contain quaternary ammonium groups. The polymers are of linear character in the sense that they are not cross-linked although they may contain numerous branches from the linear backbone. The linear backbone or chain consists substantially entirely of direct carbon-to-carbon linkages, there being no intervening or interrupting non-carbon atoms except in the terminal units of the polymer. The polymers contain quaternary ammonium groups in side chains or branch groups and such quaternary ammonium groups are connected to the linear backbone by alkyleneamido linkages.

The amide linkage contributes to water-solubility where the polymers are of water-soluble or water-dispersible character and tends to reduce hydrophobicity where a water-insoluble polymer is involved. The amide linkages also provide formaldehyde reactivity when a reactive hydrogen is carried on the nitrogen of this linkage. The amide group also enhances the resistance of the polymer to the tendency of hard water to deactivate the polymer when it is of a type having bactericidal properties. It is possible that this is accomplished by a sequestering or chelating action.

The polymers of the present invention have fungicidal and bactericidal effect and have the unusual characteristic of being non-phytotoxic. In connection with these uses, the amido linkage shows an outstanding advantage over an ester linkage in that it is far more stable to ultraviolet light and to moisture, making the quaternary compounds of the present invention more practical for field use than similar compounds in which the quaternary ammonium groups are connected to the linear polymer chain by means of ester linkages.

Various methods may be employed for making the quaternary ammonium compounds of the present invention as follows:

(a) They may be made by polymerization of the corresponding quaternized aminoalkylamide of an α,β-unsaturated monocarboxylic acid. Such polymerization, of course, may include copolymerization with one or more other comonomers.

(b) A second way of making the new compound is to polymerize the corresponding tertiary-aminoalkylamide of an α,β-unsaturated monocarboxylic acid, and subsequently to quaternize the polymer.

(c) A third, and for some purposes preferred, procedure is by the aminolysis of a polymerized ester of an α,β-unsaturated acid with an alkylenediamine in which one of the nitrogens is a tertiary nitrogen atom, and the subsequent quaternization of the aminolyzed polymer.

(d) A fourth method is to aminolyze a polymerized ester of α,β-unsaturated aliphatic acid by means of a quaternized amine containing, besides the quaternary nitrogen atom, a primary or secondary nitrogen atom.

*Procedure (a).*—The first procedure involves the preparation of an acrylamide, methacrylamide, α-ethylacrylamide, or α-propylacrylamide from the chloride of the corresponding acid (acrylic, methacrylic, ethacrylic, or propacrylic) and an amine containing a tertiary nitrogen and one primary or secondary nitrogen. For example, the unsaturated acid chlorides may be reacted with the following amines: dimethylaminoethylamine, dibutylaminoethylamine, didodecylaminoethylamine, diethanolaminoethylamine, di-(butoxyethyl)aminoethylamine, N-(dimethylaminoethyl)-N-methylamine, N-(dimethylaminoethyl)-N-butylamine, N-(dibutylaminoethyl)-N-ethylamine, bis-(dimethylaminoethyl)amine, dimethylaminopropylamine, N-(aminoethyl)morpholine, N-(aminopropyl)morpholine, dimethylaminobutylamine, dimethylaminohexylamine, dimethylaminooctylamine, dimethylaminodecylamine, 2-aminobutyldimethylamine, diethylaminopropylamine, N-(aminopropyl)-piperidine, N-(aminopropyl)pyrrolidine, dimethylaminoethoxyethylamine, (di-2-ethylhexyl)aminopropylamine, N-(aminoethyl)thiamorpholine, N-(aminoethyl)pyrrolidine, N-(aminoethyl)2,4,4-trimethylpyrrolidine, N-(aminopropyl)-N'-methyl piperazine, N-(aminopropyl)-N'-stearyl piperazine.

The resulting amide may then be quaternized with any suitable alkylating agent (which is herein intended to include aralkylating agents and substituted aralkylating agents), such as methyl chloride, ethyl chloride, benzyl chloride, allyl chloride, substituted allyl chloride, e.g., dodecylallyl chloride, dodecenyl chlorides, alkylbenzyl chlorides, e.g., octylbenzyl chlorides (from diisobutylene), any chloromethylated aromatic-like compound, e.g., chlorobenzyl chloride, chloromethylated thiophene, chloromethylated furane, chloromethylated naphthalene, or corresponding bromides or iodides, e.g., phenoxyethyl bromide, methyl iodide; dimethyl sulfate, dimethyl sulfite, dimethyl phosphite, ethylene oxide, propylene oxide, styrene oxide, and butylene oxide. For example, a mixture of 17.9 g. (0.109 mol) of monomeric dimethylaminopropylacrylamide, 13.8 g. (0.109 mol) of benzyl chloride, 74 g. of absolute ethanol (30% solids) and di-β-naphthol were heated to reflux for two hours. The product was isolated by concentration in vacuo.

The resulting quaternary ammonium nitrogen containing monomer may then be polymerized such as by the use of hydrogen peroxide as catalyst or a mixture of ammonium persulfate with sodium hydrosulfite as a catalyst. Generally, ½% of the hydrogen peroxide or a mixture of ½% of the sulfate with 0.2% of sodium hydrosulfite may be used. Transfer agents and other molecular weight regulators may be used. Generally polymers of 5,000 to at least 50,000 molecular weight may be obtained by this procedure. By copolymerization with other monoethylenically unsaturated monomers, the properties of the final polymer and particularly its solubility may be controlled or predetermined at will.

Examples of comonomers that may be polymerized with the quaternary ammonium acrylamide monomer include acrylonitrile, the vinyl aromatic compounds, more particularly the vinyl aromatic hydrocarbons (e.g., styrene, isopropenyl toluene, the various dialkyl styrenes, etc.), other aliphatic compounds containing a $CH_2=C<$ grouping, e.g., the various substituted acrylonitriles (e.g., methacryonitrile, ethacryonitrile, phenylacrylonitrile, etc.), acrylamide and the various substituted acrylamides (e.g., methacrylamide, ethacrylamide, the various N-substituted acrylamides which are different from those used in practicing the present invention and the various N-substituted alkacrylamides, for instance N-methylol acrylamide, N-monoalkyl and -dialkyl acrylamides and methacrylamides, e.g., N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, etc., esters of an acrylic acid (including acrylic acid itself and the various alpha-substituted acrylic acids, e.g., methacrylic acid, ethacrylic acid, phenylacrylic, acid, etc., the lower alpha-substituted acids just named being generically represented by the formula

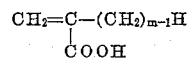

wherein m is an integer having a value of 1 to 3), more particularly the alkyl esters of an acrylic acid derived from an alcohol having from 1 to 12 or more carbon atoms, e.g., the ethyl, propyl, isopropyl, n-butyl, isobutyl, sec-butyl, tert-butyl, amyl, hexyl, heptyl, octyl decyl, dodecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2=C<$ grouping.

Depending upon the particular comonomer selected, the polymer obtained may be changed from water-soluble to oil-soluble, to alcohol-soluble, or to any combination of these solubilities.

*Procedure (b).*—The second method involves the preparation of the amide from the chlorides of the acids mentioned above and amines mentioned above and subsequent polymerization and quaternization. The amide may be polymerized with or without one or more comonomers from the list hereinabove by means of hydrogen peroxide or ammonium or potassium persulfate in combination with sodium hydrosulfite in the proportions mentioned hereinabove, and the resulting polymer is then quaternized by reacting it with sufficient of an alkylating or aralkylating agent of the list hereinabove to partially or completely convert the tertiary amino nitrogen atoms in the polymer or copolymer to quaternary nitrogen groups. This procedure is adapted to produce polymers of lower molecular weight, such as from 5,000 to 100,000 but it is generally necessary to take special precautions to avoid gelation when higher polymers are desired.

*Procedure (c).*—The third method which is by far the most preferable for many purposes is that of the aminolysis of polymerized acrylic esters which may be either partial or complete. Any polymerized ester of the unsaturated acids mentioned in the discussion of Procedure (a) above may be employed. A polymerized ester may be a homopolymer or it may be a copolymer comprising two or more different esters or it may comprise one or more of the acrylic ester monomers copolymerized with one or more of the comonomers listed under Procedure (a) hereinabove.

A polymer of methyl acrylate, either a homopolymer or a copolymer, is the preferred polymeric starting material because of the ease and rapidity with which aminolysis may be effected with any of the amines listed under Procedure (a) hereinabove. Generally, aminolysis is performed in a medium which is anhydrous or contains but little water unless considerable carboxyl groups are desired in the final polymeric product. The amine itself may serve as the solvent as well as the reactant for aminolyzing the polymerized methyl acrylate and aminolysis may be effected at temperatures of 90 to 130° C. in a time of 96 hours to 24 hours respectively, the time required generally being inversely proportional to the temperature. In the presence of a 3-to-4-fold excess of amine, complete aminolysis may be effected in the times and the temperatures just mentioned, and it has been found that the higher the temperature employed, the higher is the final molecular weight of polymer obtained. A catalyst to accelerate the reaction is unnecessary, but an alkoxide, such as sodium methoxide, sodium ethoxide, or the like, may be used in amounts of from ½ to 20% by weight of the polymer. With a catalyst, an amount of the amine equivalent to the ester groups to be aminolyzed may be dissolved in a solvent such as toluene or additional amine, either the same or different, or an alcohol, such as methanol, ethanol, or butanol, and the complete aminolysis may be obtained in eight hours at a temperature of 80° to 90° C. An advantageous system is to start in toluene in which the polymerized ester is soluble and during the reaction to add an alcohol such as methanol, ethanol, or butanol in which the aminolyzed polymer is soluble, and subsequently to remove the solvent to obtain the final polymer.

The polymeric esters of alcohols other than methyl, such as of ethyl alcohol, propyl alcohol, butyl alcohol, and so on, require an increase in tthe time and temperature factor to produce a corresponding conversion of ester groups to amido groups in the polymer. Generally, when the amine used contains a primary nitrogen atom, it is necessary to maintain the reaction medium containing the polymeric ester and amine at a temperature below 130° C. in order to avoid imide formation with consequent cross-linking and insolubilization of the final polymer. However, when the aminolysis is effected by an amine containing a secondary nitrogen atom rather than a primary nitrogen atom, there is no possibility of cross-linking or imide formation so that higher temperatures may be used up to 180° to 200° C.

Polymerized esters of the unsaturated acids in which the α-carbon atom is substituted by an alkyl group, such as methyl, ethyl, propyl or isopropyl, of which methyl methacrylate, methyl ethylacrylate and methyl propylacrylate are typical, are more difficult to aminolyze and when an amine containing a primary nitrogen atom is used for this purpose, it is difficult to get aminolysis of 60% to 100% of the ester groups witthout cross-linking. Generally, however, the aminolysis may be effected at temperatures of 180° to 200° C. for three to seven hours with production of uncross-linked products which are up to 60% aminolyzed. Generally to get a larger proportion of the ester groups or all thereof in the polymer aminolyzed, a 5-to-10-fold excess of amine may be reacted at a temperature of 130° C. for a time of from four to seven days. Alternatively, an alkoxide catalyst may be used with 2-to-4-fold excess amine or an amount of amine equivalent to the ester groups to be aminolyzed may be used at 130° C.

As the alkyl substituent on the α-carbon of the acrylic acid increases in size, more drastic conditions are generally required. Similarly, as the alkyl group of the ester increases in size, more drastic conditions are necessary to effect aminolysis; thus, when polymerized methyl methacrylate is replaced with polymerized ethyl methacrylate, longer times and higher temperatures must be used. As already stated, imide formation may be prevented by the use of amines which contain a secondary nitrogen atom but no primary nitrogen atom.

The difference in reactivity of these various esters makes its possible to obtain for all practical purposes a selective aminolysis of copolymers containing different ester units. For example, when the final quaternary ammonium compound desired to be produced is one containing methyl methacrylate as comonomer units, a copolymer of methyl acrylate and methyl methacrylate in appropriate proportions may serve as a starting material so that aminolysis converts the ester groups of the methyl acrylate units to amide units without affecting the ester units of the methyl methacrylate to any considerable extent. Such an aminolysis, for example, may be effected at 80° to 120° C. in the presence of an amount of an amine which is equivalent to the ester groups in the methyl acrylate portion of the copolymer. Similarly, if it is desired to produce a copolymer containing quaternary ammonium groups with one or more comonomers of non-ester type listed under Procedure (a), such as of styrene, a corresponding copolymer, as of styrene and methyl acrylate, may be used as the starting material in which the proportion of acrylate units corresponds to the number of acrylamide units desired to be quaternized and all such acrylate units may be converted to amide groups in the aminolysis.

After the aminolysis, the resulting polymer may be quaternized by means of any of the active alkylating or aralkylating groups mentioned hereinabove under Procedure (a). The quaternization may be effected in a polar solvent, for example, in water, dimethylformamide, dimethylacetamide, acetonitrile, or a lower alcohol, such as methanol, ethanol, isopropanol, and the like. Temperatures from room temperature to 125° C., or even up to 150° C. in some cases, may be used. Preferably the temperature is maintained at 80° to 90° C. which may readily be accomplished by refluxing with ethyl alcohol as the solvent. A period of one to twelve hours, depending upon the reactivity of the alkylating agent, may be employed. Generally, about four hours suffices. If quaternization of only part of the tertiary nitrogen atoms is desired, the amount of alkylating agent may be reduced to correspond with the number of tertiary nitrogen atoms desired to be converted.

*Procedure (d).*—The fourth method for producing the new quaternized polymers is to aminolyze a polymer or copolymer of any of the esters mentioned in Procedure (c), by means of appropriate quaternized compounds containing a primary or secondary nitrogen atom besides the quaternary nitrogen atom. Thus any of the amides listed under Procedure (a) in which the tertiary nitrogen is replaced with a derived quaternary group comprising as a component an alkyl or aralkyl group corresponding to any alkylating or aralkylating agent mentioned under Procedure (a) may be used to aminolyze the polymerized esters. In general, the aminolysis is similar to that in Procedure (c), being carried out in a solvent for the initial polymer and preferably also for the final quaternary nitrogen-containing polymer. Dimethylformamide and dimethylacetamide are particularly useful as solvents. An amount of the amine equivalent to the ester units may be employed and the temperature may be from about 105° to 120° C. for 48 hours, preferably a temperature of 115° to 120° C. being employed.

Procedure (c) has the advantages that it enables one to produce readily a final quaternary ammonium nitrogen containing polymer having any molecular weight whether low or high, such as molecular weights from 5,000 to 1,000,000. It avoids the preparation and isolation of a sensitive monomer of the type required by Procedures (a) and (b). It also has versatility in that a wide variety of polymeric amides are obtainable from the same base polymer which polyamides can be converted into a wide variety of the final quaternary ammonium polymers. The preferred procedure also uses as starting materials comparatively inexpensive polymers. It has the advantage over Procedure (d) in that it does not involve such a great disparity in polarity between the starting polymers and final polymers during the aminolysis so that a wider choice of solvents (in which both the initial and final polymer are soluble) is available.

The aminolysis procedures designated (c) and (d) hereinabove practically always leave some free carboxyl groups in the aminolyzed copolymers unless extreme care is taken to maintain strictly anhydrous conditions during the reaction. The carboxyl groups can be avoided when anhydrous conditions are strictly maintained. However, it has been found that in practical operations where a small amount of water is present, the polymeric product obtained by the aminolysis step in Procedure (c) contains from 0.1 to 10 molar percent of carboxyl groups, thereby imparting an amphoteric character to the polymer. Unexpectedly, however, it has been found possible to substantially completely quaternize the tertiary nitrogen atoms in the resulting aminolyzed copolymer containing carboxyl groups without insolubilization being caused by cross-linking through salt-formation.

The properties of the copolymers depend on the character of the quaternary ammonium groups and also, on the properties and character of any other comonomer or comonomers present in the product. As pointed out before, various solubilities are obtainable. For example, the quaternary ammonium compound, obtained by the aminolysis of polymerized methyl acrylate to the extent of at least 20% of its ester groups, and having at least 20% of its units converted to quaternary ammonium units carrying smaller alkyl groups, is water-soluble. A similar polymer derived from polymerized methyl methacrylate requires at least 30% of the ester groups to be aminolyzed and then quaternized with small alkyl groups on the quaternary nitrogen in order to produce corresponding water-solubility. By providing long chain groups either on the quaternary ammonium nitrogen or in a comonomer with the quaternized amide units, oil solubility may be obtained. Generally all of the water-soluble and oil-soluble polymers are also alcohol-soluble except those having a large proportion of very long chains.

The polymers are useful for many purposes. Thus, they serve as bactericides, fungicides; antistatic agents for treatment of hydrophobic plastic materials such as cellulose esters, cellulose acetate, vinyl resins, etc. in form of fibers, filaments, films, yarns, fabric; for absorption of acid ions from liquids, such as oils or aqueous solutions; as flocculating and aggregating agents, dispersants, softening agents for cellulosic textiles or films, especially rayon, cellulose acetate, and cotton; as modifying components of film-forming materials, to improve the dyeing of fibers, filaments, films, textiles, and other shaped articles, formed therefrom, particularly of cellulose acetate and acrylonitrile polymers containing at least 75% acrylonitrile in the polymer molecule, especially when a common solvent, such as dimethylformamide or dimethylacetamide is used to prepare a spinning or extrusion dope containing the film-forming polymer and the dye-modifying polymer; as anchoring agents, especially for addition to paper pulp or cellulosic pulps on which they are selectively absorbed and to which they are adapted to anchor acidic materials, such as copolymers of acrylic or methacrylic acid with other vinyl monomers as is described in McLaughlin, Serial No. 410,450, filed February 15, 1954, now United States Patent 2,765,229; as a pharmaceutical, especially for fungicidal and bactericidal purposes; also to isolate protein fractions by forming an insoluble complex and regenerating the protein.

For use as non-phytotoxic bactericidal fungicides, all of the compounds of the invention are operative, but one preferred group of the compounds of the invention are those of limited water-solubility which contain 30 mole percent to 70 mole percent of quaternary N-containing monomeric units in which the average number of carbons in the monomeric units containing a quaternary group is from 10 carbons to 40 carbons. A preferred group contains 30 to 70 mole percent of monomeric units of the Formula II, in which $R^5$ is hydrogen or methyl, $n$ is an integer from 1 to 2, $R^6$ and $R^7$ are methyl or ethyl, and $R^8$ is a predominantly aliphatic hydrocarbon rgoup of 3 to 18 carbon atoms having allylic type of unsaturation, such as allyl, dodecenyl (5,5,7,7-tetramethyl-2-octenyl), or a substituted benzyl group, such as hexylbenzyl, octylbenzyl, dibutyl benzyl, 2-chloro-4-hexyl benzyl. These groups are preferred because of their tenacity on foliage and their optimum bactericidal function in conjunction with their fungicidal activity. It is to be understood that compounds having similar activity are obtainable from polymers having greater than 70 mol percent quaternary N-containing units if the average number of carbon atoms in these units is correspondingly increased.

For many purposes, as in ion-absorption applications, polymers containing 90 to 100% of quaternary nitrogen-containing units are preferred.

*Example 1*

(a) There is charged into a reaction vessel 2,090 g. of a 53.5% solution in toluene of methyl polyacrylate (13 mols) (mol. weight of 15,000 to 25,000), having a Gardner-Holdt viscosity of Z4+(75 poises) as a 50% solution in toluene at 25° C. Then 500 g. of toluene is removed by stirring and heating (steam bath) the solution at reduced pressure (30–50 mm.). To the viscous, colorless polymer solution that remains, there is added 755 g. of dimethylaminopropylamine (7½ mols) and 200 ml. of butanol, and the mixture is heated with stirring until homogeneous. A solution of 200 g. of a 25% solution of sodium methoxide in methanol (5% methoxide on polyacrylate) is diluted with 200 ml. of butanol and added dropwise to the hot solution. This addition is performed slowly to avoid gelation of the polymer. The final mixture is heated to reflux for 16 hours.

(b) The resulting solution (in which the polymer is approximately 57% aminolyzed) is diluted with 15 liters of absolute ethanol and stirred at 80° to 85° C. until the solution is homogeneous. At this temperature, 1,790 g. of an octyl benzyl chloride (7½ mols) (obtained by chloromethylation of the alkylation product of benzene with octene-2) is added slowly. The resulting solution is heated at 80° to 85° C. for about 12 hours. The quaternary compound isolated by evaporating the solvent, slurrying the solid residue with petroleum ether, and drying is a slightly water-soluble light tan colored powder having a total nitrogen content of 5.2% and chlorine content of 7.3%. The theoretical values for the corresponding quaternary compound of a completely aminolyzed polymer are 7.1% N and 9.0% Cl. The compound isolated exhibits excellent resistance to hydrolysis and ultraviolet radiation.

(c) The solution resulting from part (b) hereof may be used as such or diluted with acetone and then converted to a wettable powder by incorporation of dispersants and inorganic dusts, such as talc and clay, and drying. A wettable dust thus obtained has a fungitoxicity for *Stemphylium sarcinaeforme* equivalent to an $LD_{50}$ (lethal dose for 50% inhibition of the germination of spores) of 10 to 50 p.p.m. and against *Monilinia fructicola* e.g., to an $LD_{50}$ of 5 to 10 p.p.m. and shows excellent tenacity.

It has a phenol coefficient of 19 against *Salmonella typhosa* and 1.3 against *Staphylococcus aureus* and appears to be only slightly deactivated by polyvalent cations (such as Ca, Mg), that occur in hard water.

*Example 2*

(a) The aminolysis product of part (a) of Example 1 is quaternized with benzyl chloride (7½ mols) by the procedure of Example 1(b) instead of octyl benzyl chloride. The resulting quaternary compound is freed of solvent and obtained as a light tan colored powder readily soluble in water. This material has an $LD_{50}$ toward *Stemphylium sarcinaeforme* and *Monilinia fructicola* of 5 parts per million but has relatively poor tenacity. At 1% concentration it showed no phytotoxicity against tomatoes. However, the quaternary monomer, benzyl dimethyl ammonium propyl acrylamide chloride showed approximately one-tenth as much fungitoxicity but severely harmed the plant.

The benzyl chloride polyquaternary has a phenol coefficient of 1.9 against *Salmonella typhosa* and 1.3 against *Staphylococcus aureus*. It does not appear to be inhibited by serum.

(b) Quaternary products having similar toxic properties are obtained by quaternization with dimethylsulfate. These polymers are particularly useful as anchoring agents for paper pulp and for the preparation of permselective membranes.

*Example 3*

The aminolysis product of part (a) of Example 1 is quaternized with allyl chloride (7½ mols) by the procedure of Example 1(b). The resulting quaternized compound is freed of solvent and obtained as a light tan colored powder readily soluble in water. This material has an $LD_{50}$ toward *Stemphylium sarcinaeforme* and *Monilinia fructicola* of between 1 and 5 parts per million and has excellent tenacity. At 1% concentration, it shows no phytotoxicity against tomatoes.

*Example 4*

The aminolysis product of part (a) of Example 1 is quaternized by the procedure of Example 1(b) except that the alkylating agent is replaced with 7½ mols of 5,5,7,7-tetramethyl-2-octenyl chloride. The resulting quaternary compound is freed of solvent and obtained as a light tan colored powder slightly soluble in water. This material has an $LD_{50}$ toward *Stemphylium sarcinaeforme* of less than 1 and toward *Monilinia fructicola* of 1 to 2.5 parts per million and has a fair tenacity. At 1% concentration it shows no toxicity against tomatoes. This quaternary ammonium compound has a phenol coefficient of 35 against *Salmonella typhosa* and of 18 against *Staphylococcus aureus*.

*Example 5*

The aminolysis product of Example 1(a) is quaternized by the procedure of Example 1(b) except that the alkylating agent is replaced with 7½ mols of a methyl dodecylbenzyl chloride (the chloromethylation product of the compound obtained by the alkylation of toluene with propylene tetramer). The resulting quaternary compound is freed of solvent and obtained as a water-insoluble light tan colored product. It has an $LD_{50}$ toward *Stemphylium sarcinaeforme* of 10 and toward *Monilinia fructicola* of 100 parts per million and has a fair tenacity. At 1% concentration, it shows no toxicity against tomatoes. The compound has a phenol coefficient of 11 against *Salmonella typhosa* and of 6.7 against *Staphylococcus aureus*.

*Example 6*

(a) Purified methyl polyacrylate (86 g.) of Example 1 is introduced into a reaction vessel and 408 g. of dimethylaminopropylamine (4 mols) are added. The mixture is heated at 100° C. to effect solution and then heated at 115° C. to 120° C. for 24 hours. Excess amine is removed by stripping under reduced pressure and the substantially completely aminolyzed product is isolated as a tan solid. It contained 17% N (theoretical 17.9% N). It is highly water-soluble. Solutions of 10% concentration are of a thin consistency (Gardner-Holdt viscosity of less than A).

(b) The aminolyzed product (85 g.) is introduced into 425 g. of absolute ethanol in a reaction vessel and 197 g. of the octylbenzyl chloride of Example 1 are added and the quaternization is effected as in Example 1(b).

The tan solid obtained has slight solubility in water. It is a non-phytotoxic fungicide and has fair tenacity.

*Example 7*

The aminolysis product of Example 6(a) is quaternized with sufficient dimethyl sulfate to quaternize all available tertiary nitrogen atoms. The product is a water-soluble solid having excellent fungitoxicity and bactericidal activity. When added to a clay slurry, the product shows aggregating or flocculating activity when used in small amounts on the order of 0.01% or less and as a dispersant at higher concentrations, such as ½ to 1%. It thus is useful in low concentration to condition soils. It is also useful at somewhat higher concentrations as pigment dispersants in the pigment-dyeing or printing of textiles.

A solution in acetone containing 5 to 10% water of 1.5% of the quaternized polymer and 15% of cellulose acetate is extruded as a thin film into water as a coagulant to produce a membrane containing the polymer and having ion permselectivity. This quaternary compound, when introduced into a paper pulp in a beater in accordance with the procedure of application Serial No. 410,450 above, is an efficient anchor for synthetic linear polymers containing from 0.5 to 8% by weight of acrylic acid, methacrylic acid or itaconic acid. It is an efficient antistatic agent for fibers to be processed as by drafting, carding, twisting, etc., and for textile yarns and fabrics.

It may be dissolved in a dimethyl formamide solution of a polymer of acrylonitrile in an amount of 5% to 10% by weight of the polyacrylonitrile to improve the subsequent dyeing of fibers or other shaped articles thereof and also their moisture retention or regain.

*Example 8*

(a) A polymethylacrylate (having a viscosity of Z2—Gardner-Holdt) at 25° C. in 20% solution in ethyl acetate (mol. wt. of 200,000 to 250,000) is dissolved in excess dimethylaminopropylamine (4 mols per mol of polyacrylate) and heated at 115–120° C. for 24 hours. The polymer is isolated by removal of excess amine (evaporation under reduced pressure). It is a highly water-soluble, hygroscopic solid which produces a viscous solution in water even at a low concentration of 1%.

(b) It is quaternized by dimethyl sulfate by the procedure of Example 7 and by benzyl chloride by the procedure of Example 2(a). These high molecular weight products are especially useful as flocculating and aggregating agents for conditioning soils, improving filtration, especially of acid-leached ores and clarification of sugarcane extracts, purification of water supplies, concentration of minerals and pigments. They are active over a wide pH range in conjunction with a wide variety of suspended matter. For these flocculating purposes, they are effective at extremely low concentrations of 2 to 100 p.p.m.

*Example 9*

A copolymer of methyl methacrylate and methyl acrylate containing 5 mole percent of the latter is dissolved in excess aminopropylpiperidine and heated at 115° C. for 24 hours. A sample is removed and the product isolated by precipitation and washing with methanol. Nitrogen analysis indicates the presence of approximately 5 mol percent of amide. The remainder of the mixture is heated to 180–200° C. for 3 to 4 hours. This time the product is isolated by washing with petroleum ether. The resulting tan solid is soluble in methanol and dilute hydrochloric acid. Nitrogen analysis indicates that 60% of the polymer is amide.

A solution of the 60% aminolyzed material alkylated with an equivalent molar quantity of octylbenzyl chloride gives a quaternary useful in the formulation of bacetericidal fungicides.

*Example 10*

A polymer composed of 10 mol percent methyl acrylate and 90 mol percent ethyl acrylate is dissolved in sufficient toluene to form a 50% solution by weight. A molar equivalent of di-2-(ethylhexyl)aminopropylamine is added, and the solution is heated to 80° C. To this solution is added a methanolic solution of sodium methoxide containing sufficient base to be 10 mol percent of the amine used. The reaction is maintained at 80° C. for 24 hours, after which time the reaction is essentially complete.

A portion of this solution is diluted with twice its volume of absolute ethanol, and the polymer therein is caused to react with an equivalent of dimethyl sulfate by heating for 12 hours at 80° C. The resultant solution of polyquaternary may be used in the preparation of a dispersible dust or wettable powder for use as a non-phytotoxic, agricultural, fungicidal bactericide.

A second portion of the initial solution of polyamide, which is composed essentially of di-2-(ethylhexyl)aminopropylacrylamide units, some residual ester units and some acrylic acid units, is alkylated with a dodecenyl chloride,

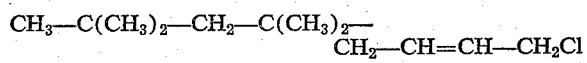

and the product is isolated by concentration at reduced pressure. The resultant quaternary is readily soluble in petroleum oils and imparts desirable detersive properties to such oils. The quaternized polymer is an excellent softening agent for cellulosic textiles.

A third portion of the polyamide solution is alkylated by heating with lauryl bromide. The resultant polyquaternary is isolated by evaporation and emulsified with water and a mixture of emulsifying agents. A cotton gabardine treated with this emulsion and dried shows a desirable degree of softness and markedly improved water repellency.

Example 11

Butyl acrylate and methyl acrylate are copolymerized in a molar ratio of 80/20. The polymer is dissolved in dimethylformamide to give a 50% solution and a molar equivalent of N-dimethylaminoethyl-N-butylamine is added. The resultant solution is heated at 150–160° C. for 48 hours. The polymer is isolated by precipitation with water and dried. Nitrogen content indicates that 40% of the ester groups present have been converted to amide.

A solution of the polymer in ethanol is alkylated with phenoxyethyl bromide and the resultant quaternary is found to be bactericidal when evaluated for phenol coefficient.

Example 12

A copolymer of styrene and methyl acrylate containing 60 mol percent of styrene is dissolved in excess di(butoxyethyl)aminoethylamine, and the solution is heated at 100° C. for 96 hours. The polymer is isolated by precipitation with isooctane and contains 32 mol percent of amide groups.

Alkylation with ethylene oxide gives a strongly basic material soluble in methanol and water-methanol mixtures. Treatment of the quaternary ammonium hydroxide with aqueous hydrochloric acid gives a neutral product, the hydroxyethyl quaternary ammonium chloride. This material has borderline water-solubility and behaves as a surfactant giving good foam when shaken with water. The polyquaternary is bactericidal and fungitoxic.

Another portion of the polyamide is alkylated with p-chlorobenzyl chloride. The resulting polyquaternary is isolated as a fairly stiff, brittle, film by evaporation of the solvent. The film thus prepared is useful as an ion-selective separator in batteries or electrolytic cells.

Example 13

A copolymer of acrylic acid and methyl acrylate containing 5 mole percent of acrylic acid is dissolved in excess aminopropyl morpholine and converted to amide by heating at 110° C. for 48 hours. Excess amine is removed by ion-exchanging a solution of the polymer with an acid-exchange resin.

The product is alkylated with methyl-dodecylbenzyl chloride to give a quaternary that is useful as a non-phytotoxic fungicide.

Example 14

A copolymer of methyl acrylate and acrylonitrile containing 40 parts of the nitrile is dissolved in dimethylformamide and dimethylaminoethylamine. The solution is heated at 140° C. for 12 hours. The resultant polymer can be formed into a film by extruding the polymer solution into water.

The polyamine modified polymer in dimethylformamide is alkylated with dimethylsulfate and the polymeric quaternary extruded as a film by coagulation with water. The dried film is tough and flexible, has good moisture regain properties and is readily dyed.

In a similar manner, polymers containing higher amounts of acrylonitrile, such as 80 to 85% by weight, may be converted to quaternary-nitrogen-modified materials which can be extruded to give strong fibers with improved moisture regain and ease of dyeability over copolymers not containing these quaternary groups.

Example 15

Ethylene and methyl acrylate are copolymerized in such ratio that the final polymer contains 10 mol percent of ethylene. The polymer is dissolved in toluene, and a molar equivalent of dimethylaminodecyl amine is added. The solution is heated to 80° C. and sodium methoxide in methanol is added slowly. About 15 mol percent of methoxide based on amine is used. The reaction is maintained at 80 to 85° C. for 12 hours. The product is isolated by evaporation of the solvent and is water-insoluble but soluble in methanol or dilute hydrochloric acid. Nitrogen analysis indicates 70% conversion to amide.

The product isolated above is divided into three portions which are alkylated with phenoxyethyl chloride, p-chlorobenzyl chloride, and dodecenyl chloride respectively. In each case the derived polyquaternary is a good bactericide and fungicide.

Example 16

A methyl acrylate-vinyl acetate copolymer containing 80 mol percent of acrylate is dissolved in excess dimethylaminoethoxyethylamine and the solution heated at 115° C. for 30 hours. The product is isolated, by precipitation with a petroleum hydrocarbon fraction and drying, as a very water-soluble solid containing 70 percent of amide groups and approximately 10 percent of hydroxyl groups derived by the aminolysis of the vinyl acetate.

This product is alkylated with chloromethylnaphthalene to give a product with only slight water-solubility. Alkylation with chloromethylthiophene gives a water-soluble polyquaternary active as a fungicide.

I claim:

1. A copolymer of about 30 to 70 mole percent of methyl acrylate and about 70 to 30 mole percent of (acrylamidopropyl)dimethyl(octylbenzyl)ammonium chloride.

2. A copolymer of about 30 to 70 mole percent of methyl acrylate, about 70 to 30 mole percent of (acrylamidopropyl)dimethylbenzylammonium chloride, and at least about 0.1 mole percent of acrylic acid, the amounts of acrylate, chloride, and acid units being such as to bring the total of polymerized units in the copolymer up to 100 mole percent.

3. A copolymer of about 30 to 70 mole percent of methyl acrylate and about 70 to 30 mole percent of allyl(acrylamidopropyl)dimethylammonium chloride.

4. A copolymer of about 30 to 70 mole percent of methyl acrylate and about 70 to 30 mole percent of (acrylamidopropyl)dimethyl(5,5,7,7 - tetramethyl - 2-octenyl)ammonium chloride.

5. As a composition of matter, a linear copolymer of about 30 to 70 mole percent of amide units of the formula

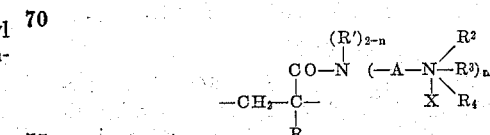

about 70 to 30 mole percent respectively of polymerized units of at least one ester of an acid of the formula

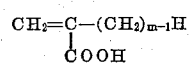

wherein $m$ is an integer having a value of 1 to 2 with a saturated aliphatic alcohol having 1 to 12 carbon atoms, and about 0.1 to 10 mole percent of units of an acid of the last-mentioned formula, the proportion of acid units being such as to bring the total of polymerized units in the copolymer up to 100 mole percent, the symbols in the first formula being defined as follows:

R is selected from the group consisting of hydrogen and methyl,

R' is selected from the group consisting of hydrogen and methyl,

A is an alkylene group having 2 to 10 carbon atoms, $R^2$ and $R^3$ are selected from the group consisting of (1) separate groups selected individually from the group consisting of alkyl groups having 1 to 12 carbon atoms, alkoxyalkyl groups having 2 to 12 carbon atoms, and (2) a single saturated aliphatic group which together with the N atom forms a heterocyclic group containing 5 to 6 atoms in the ring of which 4 to 5 are carbon and which may contain a second atom selected from the group consisting of O, N, and S, the second atom, if nitrogen, being substituted by an alkyl group having 1 to 18 carbon atoms, $R^4$ is selected from the group consisting of saturated and unsaturated aliphatic hydrocarbon groups having 1 to 18 carbon atoms, (polyalkoxy)alkyl groups having 2 to 18 carbon atoms, alkoxyalkyl groups having 2 to 18 carbon atoms, hydroxyalkyl groups having 2 to 18 carbon atoms, aralkyl and substituted aralkyl groups having 7 to 24 carbon atoms, and phenoxyalkyl groups having 7 to 24 carbon atoms, X is selected from the group consisting of OH and negative, salt-forming atoms and radicals, and $n$ is an integer having a value from 1 to 2, the average number of carbon atoms in the aforesaid amide units in the copolymer being from 10 to 40.

6. As a composition of matter, a linear copolymer of about 0.1 to 10 mole percent of acrylic acid, 30 to 70 mole percent of amide units, and the balance, to make 100 mole percent, of methyl acrylate, the amide units being of the formula

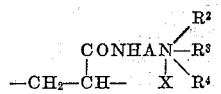

where

A is a hydrocarbon alkylene group having 2 to 10 carbon atoms, $R^2$ and $R^3$ are selected from the group consisting of (1) separate groups selected individually from the group consisting of alkyl groups having 1 to 12 carbon atoms, alkoxyalkyl groups having 2 to 12 carbon atoms, and (2) a single saturated aliphatic group which together with the N atom forms a heterocyclic group containing 5 to 6 atoms in the ring of which 4 to 5 are carbon and any remaining atoms in said ring being selected from the group consisting of O, N, and S and if nitrogen, being substituted by an alkyl group having 1 to 18 carbon atoms, $R_4$ is selected from the group consisting of saturated and unsaturated aliphatic hydrocarbon groups having 1 to 18 carbon atoms, (polyalkoxy)alkyl groups having 2 to 18 carbon atoms, alkoxyalkyl groups having 2 to 18 carbon atoms, hydroxyalkyl groups having 2 to 18 carbon atoms, aralkyl and substituted aralkyl groups having 7 to 24 carbon atoms, and phenoxyalkyl groups having 7 to 24 carbon atoms, and X is selected from the group consisting of OH and negative, salt-forming atoms and radicals, the average number of carbon atoms in the aforesaid amide units in the copolymer being from 10 to 40.

7. As a composition of matter, a linear copolymer of about 30 to 70 mole percent of amide units of the formula

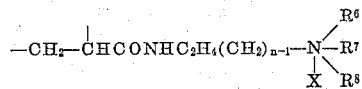

about 0.1 to 10 mole percent of units of an acid of the formula

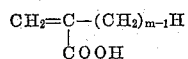

where $m$ is an integer having a value of 1 to 2, and the balance, to make 100 mole percent, of at least one ester of an acid of the last-mentioned formula with a saturated aliphatic alcohol having 1 to 12 carbon atoms, the symbols in the first formula being defined as follows:

$n$ is an integer having a value of 1 to 2, $R^6$ is an alkyl group having 1 to 2 carbon atoms, $R^7$ is an alkyl group having 1 to 2 carbon atoms, $R^8$ is an aliphatic hydrocarbon group having 3 to 18 carbon atoms, and X is an anion.

8. A composition as defined in claim 7 in which the group $R^8$ has allylic unsaturation.

9. A composition as defined in claim 8 in which the ester units are methyl acrylate units.

10. A composition as defined in claim 7 in which the group $R^8$ is a substituted benzyl group.

11. A composition as defined in claim 10 in which the ester units are methyl acrylate units.

12. As a composition of matter, a linear copolymer of about 30 to 70 mole percent of amide units of the formula

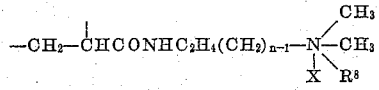

about 0.1 to 10 mole percent of acrylic acid, and the balance, to make 100 mole percent, of polymerized units of at least one ester of an acid of the formula

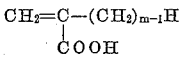

where $m$ is an integer having a value of 1 to 2, with a saturated aliphatic alcohol having 1 to 12 carbon atoms, the symbols in the first formula being defined as follows:

$R^8$ is an aliphatic hydrocarbon group having 3 to 18 carbon atoms and allylic unsaturation.

X is an anion, and $n$ is an integer having a value of 1 to 2.

13. A composition as defined in claim 12 in which the ester units are methyl acrylate units.

14. As a composition of matter, a linear copolymer of about 30 to 70 mole percent of amide units of the formula

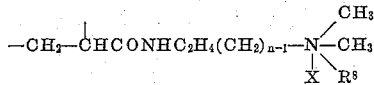

about 0.1 to 10 mole percent of acrylic acid, and the balance, to make 100 mole percent, of polymerized units of at least one ester of an acid of the formula

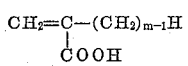

wherein $m$ is an integer having a value of 1 to 2, with a saturated aliphatic alcohol having 1 to 12 carbon atoms, the symbols in the first formula being defined as follows:

$R^8$ is a substituted benzyl group having 8 to 18 carbon atoms,

X is an anion, and $n$ is an integer having a value of 1 to 2.

15. A composition as defined in claim 14 in which the ester units are methyl acrylate units.

16. A copolymer of about 0.1 to 10 mole percent of acrylic acid, from zero to 70 mole percent of N-(dimethylaminopropyl)-acrylamide, about 70 to 30 mole percent of (acrylamidopropyl)dimethyl(5,5,7,7-tetramethyl-2-octentyl)ammonium chloride, and the balance, to make 100 mole percent, of methyl acrylate.

17. As a composition of matter, a water-soluble polymerization product which contains copolymerized (1) at least one mole percent of an amide of acrylic acid containing in the amide portion of the molecule one quaternary nitrogen atom which by one of its four valences is bound to the amide nitrogen by an alkylene radical containing at least two and at the most three carbon atoms, and the remaining three valences of the quarternary nitrogen atom are bound to saturated aliphatic radicals, and (2) at least one other polymerizable monoethylenically unsaturated compound, said copolymer product comprising at least one ester of acrylic acid with an alkanol having 1 to 4 carbon atoms and at least 0.1 mole percent of acrylic acid, the total polymerized units amounting to 100 mole percent.

18. As a composition of matter, a water-soluble polymerization product which contains copolymerized (1) at least 20 mole percent of an amide of acrylic acid containing in the amide portion of the molecule one quaternary nitrogen atom which by one of its four valences is bound to the amide nitrogen by an alkylene radical containing at least two and at the most three carbon atoms, and the remaining three valences of the quaternary nitrogen atom are bound to saturated aliphatic radicals, and (2) at least one other polymerizable monoethylenically unsaturated compound including at least 0.1 mole percent of acrylic acid.

19. As a composition of matter, a water-soluble linear copolymer of at least about one mole percent of amide units of the formula

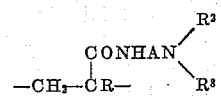

units of an ester of an acid of the formula

—CH$_2$—CR—
         |
         COOH at least 0.1 mole percent of units of an acid of the last-mentioned formula, and any balance needed to make 100 mole percent consisting of at least one other monoethylenically unsaturated compound, the symbols in the formula being defined as follows:

R is selected from the group consisting of H and alkyl groups having 1 to 3 carbon atoms, A is a hydrocarbon alkylene group having 2 to 10 carbon atoms, $R^2$ and $R^3$ are selected from the group consisting of (1) separate groups selected individually from the group consisting of alkyl groups having 1 to 12 carbon atoms, alkoxyalkyl groups having 2 to 12 carbon atoms, and (2) a single saturated aliphatic group which together with the N atom forms a heterocyclic group containing 5 to 6 atoms in the ring of which 4 to 5 are carbon and which may contain a second atom selected from the group consisting of O, N, and S, the second atom, if nitrogen, being substituted by an alkyl group having 1 to 18 carbon atoms, $R^4$ is selected from the group consisting of saturated 1 to 18 carbon atoms, (polyalkoxy)alkyl groups having 2 to 18 carbon atoms, alkoxyalkyl groups having 2 to 18 carbon atoms, hydroxyalkyl groups having 2 to 18 carbon atoms, aralkyl and substituted aralkyl groups having 7 to 24 carbon atoms, and phenoxyalkyl groups having 7 to 24 carbon atoms, and X is selected from the group consisting of OH and negative, salt-forming atoms and radicals.

20. As a composition of matter, a water-soluble linear copolymer of at least about 20 mole percent of amide units of the formula

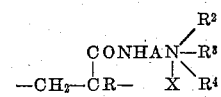

from 0.1 to 10 mole percent of polymerized units of an acid of the formula H$_2$C=C(R)COOH, from zero to 80 mole percent of amide units of the formula

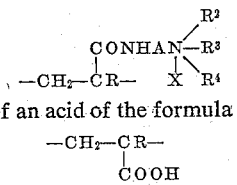

and any balance, to make 100 mole percent, of at least one other monoethylenically unsaturated compound, the symbols in the formulas being defined as follows:

R is selected from the group consisting of H and alkyl groups having 1 to 3 carbon atoms, A is a hydrocarbon alkylene group having 2 to 10 carbon atoms, $R^2$ and $R^3$ are selected from the group consisting of (1) separate groups selected individually from the group consisting of alkyl groups having 1 to 12 carbon atoms, alkoxyalkyl groups having 2 to 12 carbon atoms, and (2) a single saturated aliphatic group which together with the N atom forms a heterocyclic group containing 5 to 6 atoms in the ring of which 4 to 5 are carbon and which may contain a second atom selected from the group consisting of O, N, and S, the second atom, if nitrogen, being substituted by an alkyl group having 1 to 18 carbon atoms, $R^4$ is selected from the group consisting of saturated and unsaturated aliphatic hydrocarbon groups having 1 to 18 carbon atoms, (polyalkoxy)alkyl groups having 2 to 18 carbon atoms, alkoxyalkyl groups having 2 to 18 carbon atoms, hydroxyalkyl groups having 2 to 18 carbon atoms, aralkyl and substituted aralkyl groups having 7 to 24 carbon atoms, and phenoxyalkyl groups having 7 to 24 carbon atoms, and X is selected from the group consisting of OH and negative, salt-forming atoms and radicals.

21. A polymerization product which contains copolymerized at least 20 mole percent of acrylamide containing in the amide portion of the molecule at least one quaternary nitrogen atom which is bound to the amide nitrogen by a bridge of at least two carbon atoms and at the most three carbon atoms, the remaining three valences of the quaternary nitrogen atom being bound to saturated aliphatic radicals, at least 0.1 mole percent of acrylic acid, and at least one other monoethylenically unsaturated polymerizable compound including about 60 mole percent of styrene.

22. A water-soluble polymerization product which contains copolymerized (1) about 32 mole percent of acrylamide containing in the amide portion of the molecule a quaternary nitrogen atom which is bound to the amide nitrogen atom by an alkylene bridge of two to three carbon atoms, the remaining three valences of the quaternary nitrogen atom being bound to saturated aliphatic radicals, (2) about 60 mole percent of styrene, and (3) the remainder to make 100 mole percent comprising methyl acrylate and acrylic acid, said polymerization product containing at least 0.1 mole percent of acrylic acid.

23. As a composition of matter, a water-soluble linear copolymer of at least about 20 mole percent of amide units of the formula

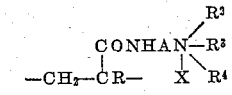

at least 0.1 mole percent of acrylic acid units, and any balance needed to make 100 mole percent consisting of at least one other monoethylenically unsaturated compound, said copolymer comprising units of at least one monomer selected from the group consisting of alkyl esters of an acid of the formula $$H_2C=C(R)COOH$$

and compounds of the formula $$H_2C=C(R)-CONHA\diagdown_{R^3}^{R^2}$$

the symbols in the formulas being defined as follows:

R is selected from the group consisting of H and alkyl groups having 1 to 3 carbon atoms, A is a hydrocarbon alkylene group having 2 to 10 carbon atoms, $R^2$ and $R^3$ are selected from the group consisting of (1) separate groups selected individually from the group consisting of alkyl groups having 1 to 12 carbon atoms, alkoxy-alkyl groups having 2 to 12 carbon atoms, and (2) a single saturated aliphatic group which together with the N atom forms a heterocyclic group containing 5 to 6 atoms in the ring of which 4 to 5 are carbon and which may contain a second atom selected from the group consisting of O, N, and S, the second atom, if nitrogen, being substituted by an alkyl group having 1 to 18 carbon atoms, $R^4$ is selected from the group consisting of saturated and unsaturated aliphatic hydrocarbon groups having 1 to 18 carbon atoms, (polyalkoxy)alkyl groups having 2 to 18 carbon atoms, alkoxyalkyl groups having 2 to 18 carbon atoms, hydroxyalkyl groups having 2 to 18 carbon atoms, aralkyl and substituted aralkyl groups having 7 to 24 carbon atoms, and phenoxyalkyl groups having 7 to 24 carbon atoms, and X is selected from the group consisting of OH and negative, salt-forming atoms and radicals.

References Cited in the file of this patent

UNITED STATES PATENTS

| | | |
|---|---|---|
| 2,311,548 | Jacobson et al. | Feb. 16, 1943 |
| 2,567,836 | Anthes | Sept. 11, 1951 |
| 2,572,561 | Ham | Oct. 23, 1951 |
| 2,595,907 | Thomas et al. | May 6, 1952 |
| 2,654,729 | Price | Oct. 16, 1953 |
| 2,675,359 | Schneider | Apr. 13, 1954 |
| 2,677,679 | Barney | May 4, 1954 |
| 2,777,872 | Shacklett | Jan. 15, 1957 |
| 2,884,057 | Wilson et al. | Apr. 28, 1959 |

FOREIGN PATENTS

| | | |
|---|---|---|
| 515,194 | Belgium | Feb. 16, 1953 |

UNITED STATES PATENT OFFICE
CERTIFICATION OF CORRECTION

Patent No. 2,980,657                                April 18, 1961

Sidney Melamed

It is hereby certified that error appears in the above numbered patent requiring correction and that the said Letters Patent should read as corrected below.

Column 15, line 66, after "saturated" insert -- and unsaturated aliphatic hydrocarbon groups having --.

Signed and sealed this 29th day of August 1961.

(SEAL)
Attest:

ERNEST W. SWIDER                                    DAVID L. LADD
Attesting Officer                                     Commissioner of Patents